June 13, 1939.  H. L. KRAEFT  2,161,823
BICYCLE FRAME AND STAND CONSTRUCTION
Filed Dec. 21, 1936
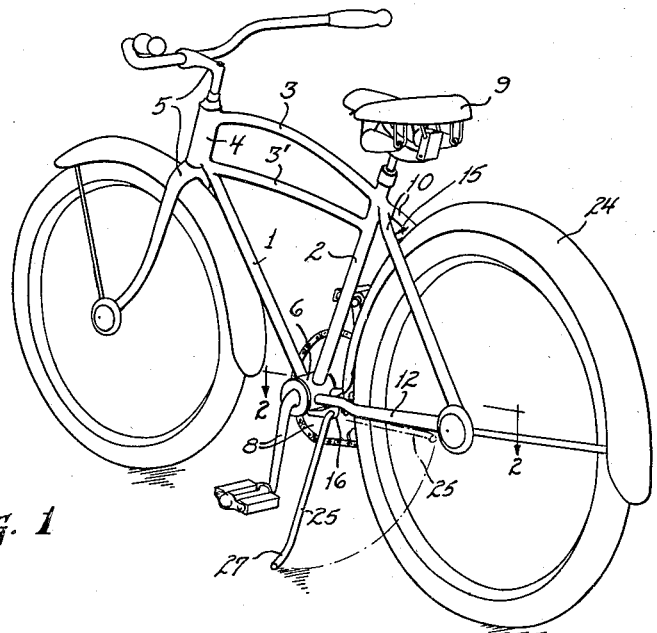
Fig. 1
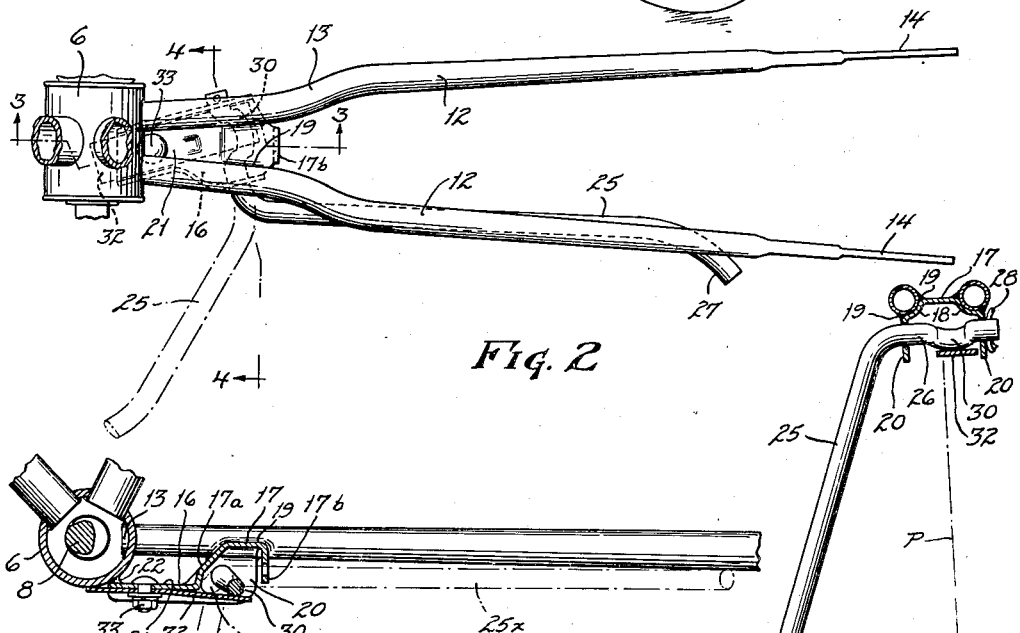
Fig. 2
Fig. 3
Fig. 4
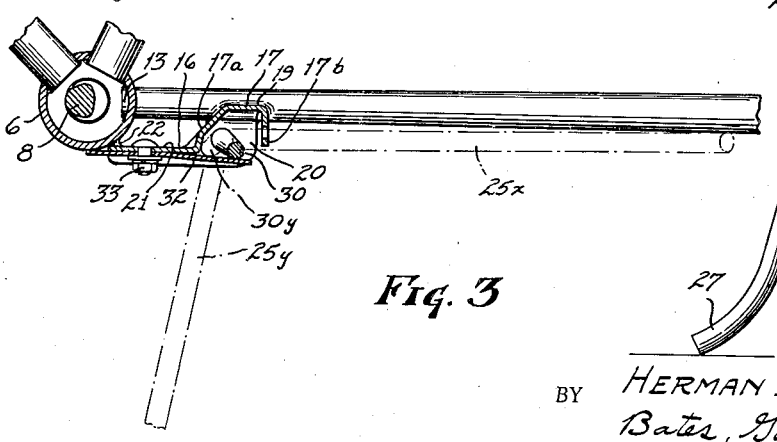
INVENTOR.
BY  HERMAN L. KRAEFT
Bates, Golrick, & Teare
ATTORNEYS Patented June 13, 1939

2,161,823

UNITED STATES PATENT OFFICE 2,161,823

BICYCLE FRAME AND STAND CONSTRUCTION

Herman L. Kraeft, Cleveland Heights, Ohio, assignor to The Murray-Ohio Manufacturing Company, Cleveland, Ohio, a corporation of Ohio Application December 21, 1936, Serial No. 116,857

3 Claims. (Cl. 280—301)

This invention relates to a bicycle frame construction, and more specifically to an adjustable stand or support for bicycles, supported on such frame.

One object is to provide a simple means for strengthening and bracing the rear-wheel-supporting fork of a bicycle. Another object is to provide a combined supporting stand bracket and transverse strut for the arms of the lower rear wheel-supporting fork of a bicycle.

Still another object is to provide a simple and effective adjustable support or stand for a bicycle frame, wherein the essential supporting part or parts will not interfere with the operation of driving and steering, yet which part or parts will be readily available for adjustment into a highly effective supporting position, as in contact with the ground.

A further specific object is to provide a strong supporting stand for a bicycle, wherein the effective supporting part in its inactive or carrying position lies substantially in the vertical plane of one of the rear wheel supporting fork members of the frame, yet which, in operating position, is directed away from the frame at a comparatively wide angle.

Further objects and features of the invention will become apparent from the following description, relating to the accompanying drawing, showing a preferred form. The essential characteristics are summarized in the claims.

Referring to the drawing, Fig. 1 is a perspective view of a bicycle, incorporating the invention; Fig. 2 is a fragmentary plan view of the lower rear fork members of the cycle; Fig. 3 is a fragmentary sectional view, taken substantially along the line 3—3 on Fig. 2, and Fig. 4 is a detailed sectional view, taken along the line 4—4 on Fig. 2.

The cycle shown in Fig. 1 may be of any type and may be pedal or motor-driven. The frame, as shown, comprises mutually rigid frame bars 1, 2, 3 and 3', comprising the usual triangular center framework; at least two of these bars being connected to a head 4 for supporting the steering fork assembly indicated generally at 5. The bars 1 and 2 are rigidly joined to a hollow crank hanger 6, for a pedal and sprocket drive assembly 8. The frame bar 2 forms the main supporting mast for the saddle 9 and an upper rear wheel supporting fork 10 is suitably joined to the mast 2. Said fork extends downwardly to form an adjustable support for a rear wheel axle which may be of conventional construction.

The lower rear wheel supporting fork construction is shown more in detail and this comprises a pair of bars or tubes 12, which are individually joined as at 13, at their forward ends, to the crank hanger or housing 6, centrally thereof. These arms extend rearwardly a short distance, comparatively close to each other, and thence outwardly as at 13, to form adequate running space for the wheel and its tire. The extremities 14 of the arms may be substantially flat for attachment to slotted yokes which receive the wheel axle (yokes not shown). Such yokes may connect the upper and lower fork arms, on each side of the wheel, rigidly together.

For convenience in mounting the rear wheel on the upper and lower supporting fork, the arms of these forks are normally spread wider than would be necessary in order to embrace the wheel; the end portions of the arms being sprung toward each other when the wheel is fully mounted. In order to preserve the distance between the intermediate portions of the fork arms, short struts or distance pieces are usually provided between the intermediate portions of the arms, one such strut being shown at 15 in connection with the upper fork 10. By the present construction, the conventional distance piece for the lower fork bars 12 may be eliminated, since the bracket for the supporting stand functions as an effective distance piece or strut and additionally reinforces the lower frame work, as will be later shown.

The bracket for the supporting stand comprises preferably a metal stamping 16 which, at its rear portion, has a substantially U-shaped cross-section as shown in Fig. 4. This portion of the bracket comprises a web 17, having corner portions 18, which are made generally complementary to the section of the fork bars, enabling the bracket to be secured to the fork bars, as by welding at 19. The rear portion of the bracket has downwardly extending flanges 20 suitably apertured to form a pivotal mounting for the stand member 25 to be later described.

The forward portion of the web 17 extends downwardly as at 17a, and thence horizontally as at 21, the forward end of the horizontal extension being attached, for example by welding at 22, along the lower side of the crank hanger or housing 6. The lower connection for the bracket being below the plane of the upper connection and in spaced relation to the forward ends of the bars 12, a generally triangular bracing structure is afforded, including a portion of the wall of the crank hanger housing. It will thus be seen that the bracket functions as a very sturdy box-like brace for the rear fork arms, bracing these both in vertical and horizontal planes, while serving effectively as a strut and distance piece for the fork arms. In addition the bracket serves to reinforce the joint between the bars 12 and the crank hanger housing.

The rear end of the web 17 may be turned downwardly as at 17b, and apertured to support an attaching bolt or rivet for securing the lower forward end of a wheel fender 24 (Fig. 1).

As viewed in Fig. 2, it will be noted that the forwardly extending lower portion 21 of the bracket 16 is in diagonal or skewed relationship to the median plane of the cycle frame, so that the side flanges 20 are disposed out of parallelism with the frame. By this arrangement, the stand may comprise simply a metal bar 25, serving as a prop, the bar having an inwardly bent portion 26 at its upper end, extending through aligned supporting openings in the depending flanges 20 of the bracket and secured as by a cotter-pin 28. The angle between the depending portion of the prop 25 and its attaching portion 26 is such that, in the suspended position of the bar, indicated diagrammatically at 25x in Figs. 1 and 3 (full lines in Fig. 2), the bar lies parallel to the left-hand fork bar 12, well guarded from above by said fork arm. When swung down into a supporting position, as shown in full lines in Figs. 1 and 4, the lower end of the supporting bar 25 by the reason of its skewed connection with the frame, is a considerable distance from the median longitudinal plane of the cycle (see P, Fig. 4). The extremity of the supporting bar may be turned outwardly as at 27, and when the bar is in its carrying position, this outward extension, as shown in Fig. 2, provides a ready means for lowering the bar to active position. Such outwardly turned end 27 may readily be reached by the left foot of the operator when astride the saddle.

For yieldably securing the bar in its two positions, I provide a crank effect on the arm portion 26 intermediately of the supporting flanges 20; and the crank effect cooperates with a cantilever spring 32, secured to the horizontal portion 21 of the bracket as by a clamping nut 33. The free end of the spring extends below the crank portion 30 and in continuous yielding contact therewith.

As viewed in Fig. 3, the crank effect 30 extends to the right from its position of dead center when the support is occupying its suspended position 25x. When the bar is swung down to the supporting position 25y, then the crank effect occupies the position 30y, shown in broken lines. In the latter position the crank effect abuts the portion 17a of the bracket, as a limiting stop. The lower end of the bar 25, in its supporting position, is slightly ahead of the plane of the pivotal connection 26—20, so that the cycle is prevented from coasting either rearwardly or forwardly out of supported position. Such rearward-coasting is prevented by the stop (at 17a) for the crank effect 30; and forward coasting both by the weight of the cycle and the force of the spring 32. The cycle would have to vault over the prop in order to coast forwardly, and it would be unlikely to do this even if parked on a steep incline, headed down-hill.

If desired suitable anti-rattling material may be positioned between the free end portions of the supporting bar and the adjacent fork arm 12. Moreover, an auxiliary retainer in the nature of a clasp may be used between such fork arm and the support 25.

I claim:

1. In a bicycle having a crank hanger housing and a rear wheel supporting fork connected with the housing centrally thereof and extending substantially horizontally rearwardly therefrom, a bracket joining the arms of the fork intermediately of their ends, said bracket being rigidly secured to a wall of the housing in a region offset a material distance from the region of attachment of said fork, whereby the fork arms are braced in a vertical plane independently of the first-mentioned connection of the fork with the housing.

2. In a bicycle having a rear wheel supporting fork, a bracket having a web provided with portions shaped complementary to the supporting fork and adapted to engage the fork when the bracket is secured thereto, said web having a downwardly opening pocket provided with a substantially downwardly extending front wall, a prop pivotally connected to said bracket and adapted to occupy a raised position in which the prop lies substantially parallel to and in contact with a downwardly facing surface of said fork, and a lowered position in which the lower end of the prop is located a material distance away from the median line of the bicycle, and forwardly of its pivotal connection with said bracket said prop having an offset portion positioned in said pocket and adapted and arranged to engage the front wall of said pocket when the prop is in the lowered position, and a spring supported by said bracket and underlying the offset portion of said prop, and adapted and arranged when said prop is in its raised position to coact with such offset portion to urge the prop upwardly and retain it in contact with the fork.

3. In a bicycle having a crank hanger housing and a rear wheel supporting fork connected with the housing and extending substantially rearwardly therefrom, a bracket having a web provided with corner portions shaped complementary to the supporting fork, and downwardly extending apertured side flanges, the forward portion of said web extending downwardly and then forwardly to the hanger housing, whereby said bracket may be secured to both the housing and the fork, and a prop pivotally mounted in the apertures of said flanges and adapted to occupy a raised position in which the prop may lie substantially parallel and in contact with said fork, and a lowered position in which the lowered end of the prop is located a material distance away from the median line of the bicycle, said prop having an offset portion between the pivot regions, said offset portion being adapted and arranged to engage the downwardly extending portion of said web when the prop is in the lowered position to retain the bicycle in a substantially upright position, and a leaf spring secured to the bottom face of forwardly extending region of said web and underlying the offset portion of said prop, to normally urge said prop upwardly and retain it in contact with said fork.

HERMAN L. KRAEFT.